United States Patent [19]
Hochman

[11] Patent Number: 5,808,751
[45] Date of Patent: Sep. 15, 1998

[54] METHOD AND APPARATUS FOR MESSAGING OF BINARY FILES

[75] Inventor: Gary Hochman, Glen Head, N.Y.

[73] Assignee: Novell, Inc., Orem, Utah

[21] Appl. No.: 589,014

[22] Filed: Jan. 19, 1996

[51] Int. Cl.$^6$ ................................................. H04N 1/00
[52] U.S. Cl. ........................ 358/400; 358/434; 358/442
[58] Field of Search ................................. 358/434, 435, 358/436, 438, 439, 440, 442, 400

[56] References Cited

U.S. PATENT DOCUMENTS

| | | | |
|---|---|---|---|
| 5,091,790 | 2/1992 | Silverberg | 358/434 |
| 5,163,088 | 11/1992 | Lo Cascio | 358/442 |
| 5,206,743 | 4/1993 | Hochman et al. | 358/449 |
| 5,216,517 | 6/1993 | Kinashita | 358/400 |
| 5,263,082 | 11/1993 | Kotake | 379/93 |
| 5,418,628 | 5/1995 | Perkins | 358/468 |
| 5,438,433 | 8/1995 | Reifman et al. | 358/468 |
| 5,452,106 | 9/1995 | Perkins | 358/434 |
| 5,528,383 | 6/1996 | Tezuka et al. | 358/435 |

Primary Examiner—Thomas D. Lee
Attorney, Agent, or Firm—Schweitzer Cornman Gross & Bondell LLP

[57] ABSTRACT

A method and system for the transmission of non-facsimile format data between conventional facsimile units operating under CCITT protocols includes auxiliary input and output systems, such as floppy disc read/write units for the i/o of the non-facsimile data. The transmitting unit includes circuitry which decouples the conventional scanning-based input system and substitutes in its place the input system for the non-facsimile data, while the receiver unit includes analysis circuitry which decouples the conventional printer output circuitry and substitutes in its place the output system for the non-facsimile data. During the handshake communication which precedes a data transfer session the receiving unit transmits a code which advises the transmitting unit that it is capable of the receipt of non-facsimile data. The transmitting unit then permits non-facsimile data to be accepted, and advises the receiving unit that such a transmission is to be made. The auxiliary i/o systems are engaged and the non-facsimile format data is transmitted, preferably in a G3 ECM mode. The receiving unit may include virus detection software to check the received data before it can be accessed by a user.

6 Claims, 3 Drawing Sheets

METHOD AND APPARATUS FOR MESSAGING OF BINARY FILES

The present invention relates to a method and system which allows the transmission of binary format data through a communications channel established between two facsimile units.

BACKGROUND OF THE INVENTION

The use of facsimile transmission and reception equipment has become widespread. While it is presently known to incorporate facsimile transmission and reception capabilities into a personal computer (PC), utilizing a modem interface between the PC and a public telephone system, a typical facsimile machine is a stand-alone unit, coupled to the telephone system to permit the transmission and reception of facsimile coded data through a communication channel established with a compatible facsimile device similarly connected to the telephone system, and accessed through the dialing of the telephone number associated with a user's telephone system connection to which the transmission is directed.

In U.S. Pat. No. 5,206,743 to the present inventor and another, a methodology was described which permits the inclusion of routing data into a facsimile transmission to allow, at the reception end, the further direction of the facsimile transmission through a computer network system associated with the receiving facsimile unit. In particular, that patent disclosed the use of a field in the handshake protocols transmitted from the transmitting facsimile unit to the receiving facsimile unit in preparation to the transmission of the actual facsimile-encoded data.

While the foregoing invention allows for the routing and dissemination of facsimile data within a network to which the receiving unit is coupled, the receiving facsimile unit is limited to processing of facsimile encoded data, typically images of printed and graphical information which are generated on a page-by-page basis and are scanned or otherwise converted into a page-simulating format for input and transmission by the facsimile unit at the transmitting location. Because of the popularity of facsimile units, and particularly dedicated units, their usefulness would be significantly enhanced if, in addition to transmitting information in a facsimile format, the facsimile unit could similarly transmit data in other formats, such as a binary file. Such a facility would substantially expand the capabilities of the facsimile unit, providing for data transmission across conventional telephone lines at speeds exceeding those available for the delivery of facsimile-encoded data and could allow for the transmission of types of data, and data in formats which cannot be efficiently or effectively converted to a facsimile compatible image.

It is accordingly the purpose of the present invention to provide a method and system by which a facsimile unit may be adapted and improved to transfer data in formats other than that of a typical fax transmission.

It is a further purpose of the present invention to provide a method and system for the inputting of data into a facsimile unit for transmission to a remote facsimile unit in formats other than as page images, and for the subsequent reception and outputting of such data by the receiving facsimile unit in the format in which it was inputted.

Yet another purpose of the present invention is to provide a method and system for the control of the transmission and reception procedures of facsimile units to allow the transmission and reception of data in a variety of formats.

BRIEF DESCRIPTION OF THE INVENTION

In accordance with the foregoing and other purposes and objects, the present invention comprises a methodology and apparatus by which the ability of facsimile units to be coupled during a data exchange session to process non-facsimile data is acknowledged, and the remote or called unit is subsequently advised that the data to be transmitted to it upon establishment of the communication channel is to be in a non-facsimile format. This is accomplished by decoupling from the respective facsimile units the conventional facsimile image processing systems and coupling in their place input and output means capable of handling the desired data format. As a facsimile unit contains a modem capable of transmitting and receiving digital data, irrespective of the format of the information carried therein, the non-facsimile data can be transferred between units. The information needed to confirm and create the necessary linkage is preferably carried in portions of the handshake signals passed from the receiving unit to the transmitting unit and from the transmitting unit to the receiving unit preparatory to actual data transmission.

Typically, the data transmission may be in the form of a binary file. The transmitting facsimile unit may include input means, such as a buffer, into which the binary file may be loaded prior to the transmission process and from which the binary file is read during transmission. The receiving facsimile unit may also be provided with output means, such as a buffer, into which the received data is placed in lieu of being processed by the facsimile receiver to generate an image copy in the manner of a conventional fax transmission. The receiving buffer may then be accessed as necessary for further processing of the transmitted information. In addition, checking of the transmitted data for contamination, such as by a computer "virus", may be performed as part of the reception process.

BRIEF DESCRIPTION OF THE DRAWINGS

A fuller understanding of the present invention will be realized upon consideration of the following detailed description of a preferred, but nonetheless illustrative embodiment thereof, when considered in conjunction with the annexed drawings, wherein:

FIG. 1 is a representation of a typical TSI or CSI data field;

FIG. 2 is a representation of a TSI or CSI data field altered in accordance with the present invention;

DETAILED DESCRIPTION OF A PREFERRED EMBODIMENT

In order for a pair of facsimile units to communicate with each other, linkage must be established between the units to allow the data to be transmitted and received in a compatible manner. This linkage is performed by the use of handshake signals, which are an initial exchange of data between the facsimile units preparatory to the actual transmission of facsimile image data. Handshake signals conform to CCITT/ITU protocols to allow the machines of various manufacturers to communicate with each other.

Figure 4:
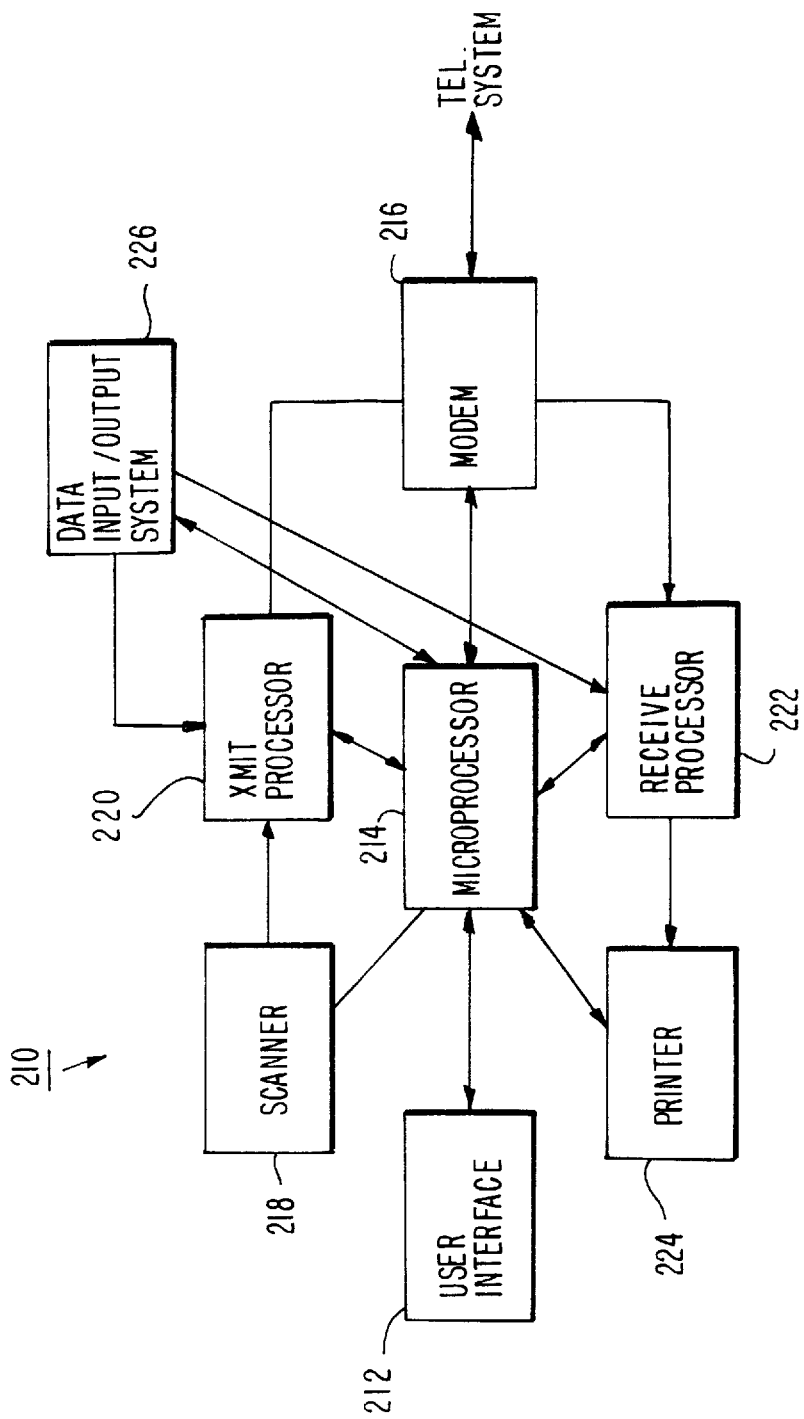
FIG. 4 is a block diagram of a facsimile unit having capabilities in accordance with the present invention.

Typically, and as known in the art, a conventional facsimile transmission between a local or calling facsimile unit sending the transmission and a remote or called facsimile unit receiving the transmission over a common carrier telephone system commences with the creation and sending of a telephone dial string which is utilized by the telephone system provider to route the call to the location of the telephone number of the remote facsimile unit. Connection to the dialed number allows the transmitting unit to transmit a CNG string to initiate a response by the receiving unit. As shown in FIG. 4, entry of the dial string is made through user interface 212 of the facsimile unit 210. The interface may include a keypad, as well as means to access telephone numbers stored by the facsimile unit. The data is transmitted by microprocessor 214 through modem 216 coupled to the telephone system.

Upon receipt of the call by the remote unit, the remote unit generates an initial set of handshake data which confirms the opening of a communication line between the sending and receiving units, and which provides the local unit with the appropriate information regarding the receiving unit. Such data, which is in a standardized format, includes a CED tone which is an acknowledgement that a non-voice terminal has answered the call, followed by initial Remote Phase B data segments, denoted as the Preamble, followed by NSF, CSI and DIS fields, which particularly identify the remote apparatus and its characteristics. This data is transmitted in accordance with the known T30 protocol.

The transmitted data is received by the local facsimile unit, which responds with its Local Phase B data, comprising a Preamble followed by TSI and DCS fields. After broadcast of the TSI and DCS fields a so-called training signal, also referred to as a Training Check Frame, is broadcast, which allows the remote unit to synchronize its operation with the local unit. The remote apparatus then follows with a CFR or Confirm For Receive signal, acknowledging that the training signal was successfully received, and that image data may be sent by the local unit. The actual facsimile data is then transmitted. Such transmission may typically include the scanning of the document to be transmitted by an optical reader 218, followed by the conversion of the scanned page data into a digital format by processor 220. The remote facsimile unit receives the digital data, and reconstructs page images by receive processor 222, which are printed or otherwise displayed by display device 224. Both transmission and reception are controlled by the respective microprocessors 214 in the facsimile units.

A part of the handshake procedure typically consists of the transfer of information provided by the facsimile unit's user, usually programmed into and stored by the facsimile unit for inclusion into the handshake transmission at the necessary time. Often the information provided by the user includes the telephone number of the line to which the facsimile machine is connected. During a facsimile transmission session this information is placed by the facsimile machine microprocessor into the transmitted TSI field of the transmitting facsimile unit, and into the transmitted CSI field of the receiving facsimile machine. This allows the unit obtaining the TSI or CSI field from the other unit to become aware of the other unit's identity, and to print or otherwise display the identity of the unit with which it is linked.

The present invention utilizes handshake fields, typically a portion of both the TSI and CSI fields, to firstly transmit a code from the receiving unit to the transmitting unit which advises the transmitting unit that the receiver is capable of receiving non-facsimile format data, and secondly, when the intended transmission is of a non-facsimile format, to advise the receiving unit that the transmitting unit is going to send data which is not in the form of a conventional facsimile transmission, but rather consists of another data format, such as a binary file. The necessary instructions for performing such steps may be carried out by the facsimile unit's microprocessor 214, suitably programmed in accordance with techniques known in the art.

Figures 1, 2:
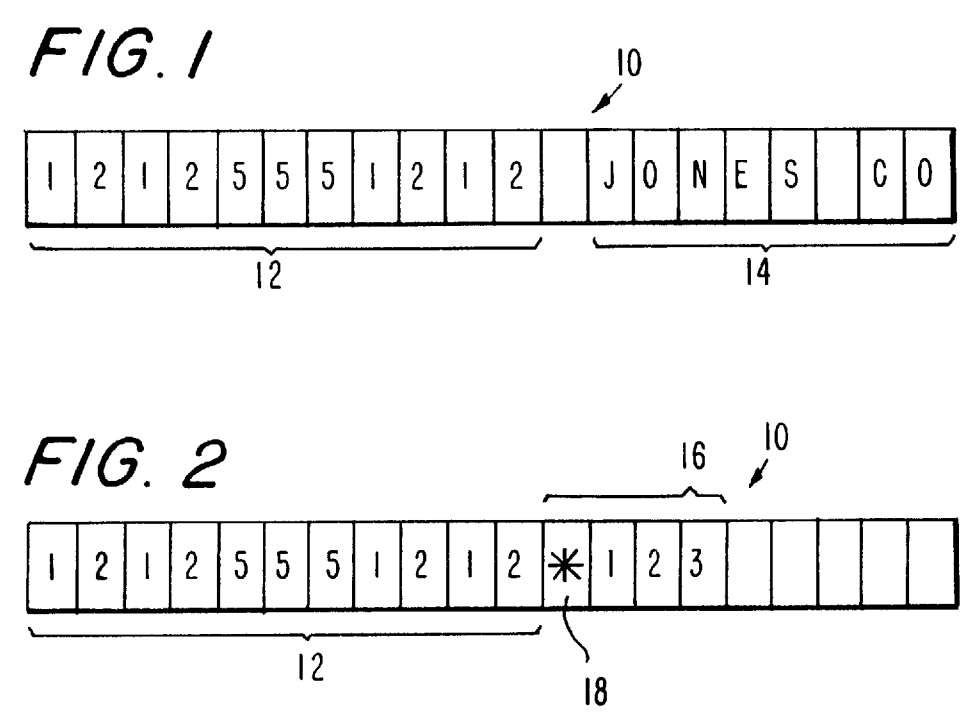

As presented in FIG. 1, a typical CSI or TSI field 10 may be in the form of a 20-character long data field, perhaps including the sender's telephone number 12 and the sender's identification 14. As presented in FIG. 2, this field is intended to be modified in accordance with the present invention to include a new sub-field 16, which carries a character string used to identify the transmission as a non-facsimile-image delivery. In the embodiment depicted in the Figures, four characters are accommodated within the field. The field is commenced or delineated with a unique control character 18, such as an asterisk or pound sign, which advises both the transmitting and the receiving circuitry that conventional handshake data is ending and that a new field is commencing. The control character is required to accommodate the various lengths of preceding data, which when in the form of a telephone number, for example, may be of various length due to area codes, international dialing codes and the like. The asterisk and pound sign are particularly preferred as they may be programmed through a standard DTMF (touch tone) telephone keypad, which may be part of the user interface 212. The embraced code designation is similarly preferably of digits which also allows entry through a telephone keypad. Alternatively, it is to be recognized that the presence of the control character itself may be used as an identifier. The particular code designation may correspond to a particular data format.

Figure 3:
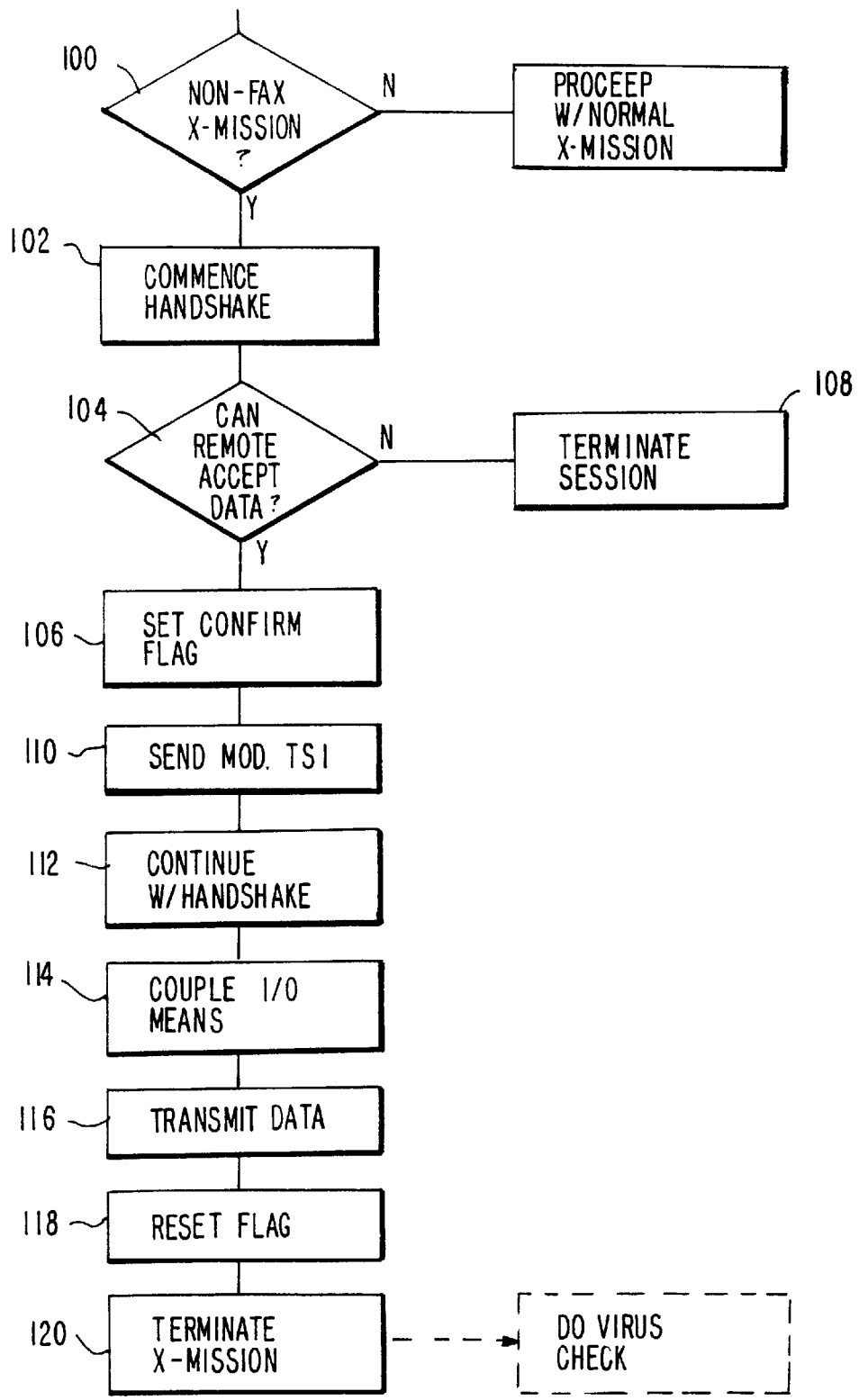
FIG. 3 is a flowchart representing the steps of a communication link between two facsimile units for the transfer of binary data in accordance with the capabilities of the present invention.

As shown in FIG. 3, a transmission of binary data in accordance with the present invention commences with the transmitting facsimile machine being advised at 100 that a non-facsimile transmission is contemplated. This may be done by appropriate software routines, initiated by an appropriate input through a selector switch or like portion of the interface 212. The call to the receiving unit is placed, and upon connection the initiation of handshake between the local and remote facsimile units commences at 102. The transmitting facsimile unit receives the remote unit's CSI field, which is inspected at 104 to confirm that the remote unit is capable of accepting a non-facsimile transmission. The receipt of the proper field can set a flag in the transmitting unit at 106, allowing a "ready to proceed" or similar message to be generated to advise the user that the transmission can be accepted. If the remote unit's CSI does not indicate that the unit is capable of handling non-facsimile data, the routine can terminate at 108. An appropriate error message or signal may accompany termination.

With confirmation of the receiving unit's ability to accept the transmission, the sending unit's TSI field is modified, typically by an appropriate software routine carried out by microprocessor 214, to include the proper non-facsimile identifier at 110, and handshake proceeds, with the modified TSI being transmitted. Receipt and identification of the modified TSI by the receiving unit alerts the receiving unit that a non-facsimile transmission is to occur.

In order to properly handle such a non-facsimile transmission, the receiving unit's DIS field, and the transmitting unit's DCS field, must handshake for a G3 error correction mode (ECM) transmission. This condition is needed to allow error-free transmission of binary data, as it enables the frame transmission of ECM data. The necessary modification to the DIS field is initiated by receipt and processing of the modified TSI by the receiving units microprocessor 214, while the DCS field may be modified by the microprocessor upon entry at the transmitting unit of the "non-facsimile" transmission command through the interface 212.

The handshake is continued at 112 between the two units preparatory to the transmission of data, through the transmission of a CFR signal from the remote unit. Concurrently, however input means at the transmitting unit and output means at the receiving unit, compatible with the intended transmission, are accessed and coupled to the associated units at 114. Such input and output may be, for example, on floppy-disc read/write unit 226, also under the control of microprocessor 214. The non-facsimile data is passed by the input means through the transmitted data processor 220 and transmitted in a known manner at 116 by modem 216 over the communication link established by the units, and is received by the receiving unit, processed by receive data processor 222, and passed to the output means 226. At the end of the transmission, the confirm flag is reset if necessary at 118, and the communication link is terminated at 120 in a normal manner.

The input and output means utilized may include a variety of devices, including RAM-type memory buffers from which and into which the digital data is transmitted, as well as hard or floppy disks, magnetic tape, or any other appropriate storage media for the data, with appropriate interface circuitry. As further known in the art, the input means need not be identical. It is contemplated that the input and output means may be integrated into a facsimile unit, or alternatively may be in the form of a unit to be removably coupled to a facsimile unit through an appropriate interface. So configured, a stand-alone facsimile unit can be used to transmit a variety of data in addition to conventional facsimile transmissions.

With the use of an appropriate reception buffer and software at the receiving unit, the present invention can further provide safeguards against the receipt and subsequent use at the receiving location of non-facsimile data which has been corrupted by computer viruses. The received data may be placed into a holding buffer comprising part of the data input/output device 226 until the transmission is terminated. With call completion a routine at the receiving unit, controlled by microprocessor 14, may be entered whereby the received data is processed to check the data for the signature of known computer viruses. If such analysis does not indicate contamination, the data may then be passed from the buffer for use. If the analysis indicates contamination, the data may be purged or otherwise handled as required, with an appropriate warning message being generated.

I claim:

1. A system for the transmission of non-facsimile data from a first to a second conventional facsimile unit operating under CCITT protocols, comprising:

means coupled to said first facsimile unit for entry of an identifying signal that a non-facsimile transmission is to be made;

means in said first facsimile unit for modifying a conventional data field to be sent as part of a handshake procedure preparatory to the transmission of a conventional facsimile transmission to the second facsimile unit to indicate a non-facsimile transmission and for transmitting said modified data field as part of an otherwise conventional handshake procedure with said second facsimile unit upon detection of said non-facsimile identifying signal;

means in said second facsimile unit for transmitting a signal to said first facsimile unit in response to receipt of said modified data field from said first facsimile unit that said second facsimile unit is capable of the receipt of non-facsimile data;

means in said first facsimile unit for processing a non-facsimile data file and transmitting said data file in a frame format in an ECM mode upon entry of said identifying signal and in response to receipt of said capability signal from said second facsimile unit; and means in said second facsimile unit for receiving said data file transmission and generating an output file identical thereto.

2. The system of claim 1, wherein said means for entry of an identifying signal comprises means for modifying a handshake TSI field of the first facsimile unit to include a non-facsimile transmission identifier therein.

3. The system of claim 1, wherein said means for transmitting a signal to said first facsimile unit includes means for transmitting a handshake CSI field having a capability identifier therein.

4. The system of claim 2, wherein said means for receiving said data file transmission includes means for identifying said non-facsimile transmission identifier in the modified TSI and switching means for placing said second facsimile unit into accepting a frame format ECM data transmission associated with said modified TSI.

5. The system of claim 4 further comprising means in said second facsimile unit for returning said second facsimile unit from the frame format ECM reception mode at an end of such transmission.

6. The system of claim 1 further comprising means coupled to said second facsimile unit for storing received data, inspecting said received data for the presence of computer viruses, and generating an output denoting the results of such inspection.

* * * * *